United States Patent [19]
Wijmans et al.

[11] Patent Number: 5,147,550
[45] Date of Patent: Sep. 15, 1992

[54] MEMBRANE PROCESS AND APPARATUS FOR REMOVING A COMPONENT FROM A FLUID STREAM

[75] Inventors: Johannes G. Wijmans, Menlo Park; Jürgen Kaschemekat; Richard W. Baker, both of Palo Alto, all of Calif.

[73] Assignee: Membrane Technology and Research, Inc., Menlo Park, Calif.

[21] Appl. No.: 803,109

[22] Filed: Dec. 5, 1991

Related U.S. Application Data

[63] Continuation-in-part of Ser. No. 635,919, Dec. 28, 1990, Pat. No. 5,071,451.

[51] Int. Cl.[5] .............................................. B01D 61/36
[52] U.S. Cl. .................................. 210/640; 210/321.6; 210/500.27
[58] Field of Search .................... 55/16, 23, 66, 68, 71, 55/73, 158; 210/640, 650, 651, 653, 500, 27, 321.6; 203/39

[56] References Cited

U.S. PATENT DOCUMENTS

| | | | |
|---|---|---|---|
| 3,903,694 | 9/1975 | Aine | 55/158 X |
| 4,230,463 | 10/1980 | Henis et al. | 55/68 X |
| 4,243,701 | 1/1981 | Riley et al. | 55/158 X |
| 4,386,944 | 6/1983 | Kimura | 55/16 |
| 4,444,571 | 4/1984 | Matson | 55/16 |
| 4,553,983 | 11/1985 | Baker | 55/16 |
| 4,606,740 | 8/1986 | Kulprathipanja | 55/158 X |
| 4,608,060 | 8/1986 | Kulprathipanja et al. | 55/16 |
| 4,654,047 | 3/1987 | Hopkins et al. | 55/16 X |
| 4,772,295 | 9/1988 | Kato et al. | 55/16 |
| 4,806,245 | 2/1989 | Böddeker | 210/640 |
| 4,840,646 | 6/1989 | Anand et al. | 55/16 |
| 4,857,078 | 8/1989 | Watler | 55/16 |
| 4,906,256 | 3/1990 | Baker et al. | 55/16 |
| 4,931,070 | 6/1990 | Prasad | 55/16 |
| 4,952,219 | 8/1990 | DiMartino, Sr. | 55/16 |
| 4,952,751 | 8/1990 | Blume et al. | 210/640 X |
| 4,963,165 | 10/1990 | Blume et al. | 55/16 |
| 4,971,699 | 11/1990 | Bartels | 55/16 X |
| 4,978,430 | 12/1990 | Nakagawa et al. | 210/640 X |
| 4,990,168 | 2/1991 | Sauer et al. | 55/16 X |
| 4,994,094 | 2/1991 | Behling et al. | 55/16 |
| 5,030,356 | 7/1991 | Blume et al. | 210/640 |
| 5,071,451 | 12/1991 | Wijmans | 55/16 |

FOREIGN PATENT DOCUMENTS 3824400  1/1990  Fed. Rep. of Germany .......... 55/16

OTHER PUBLICATIONS

S. S. Kremen, "Technology and Engineering of OGRA Spiral Wound Reverse Osmosis Membrane Modules", *Reverse Osmosis & Synthetic Membranes*, S. Sourirajan (Ed.) National Research Council of Canada, Ottawa, 1977, pp. 371-385 (Chapter 17).

Y. Sindo et al., "Calculation Methods for Multicomponent Gas Separation by Permeation", *Separation Science & Technology*, 20(5&6), pp. 445-459, 1985.

*Primary Examiner*—Robert Spitzer
*Attorney, Agent, or Firm*—J. Farrant

[57] ABSTRACT

A pervaporation process and system for removing a component from a liquid stream. The process includes a pervaporation separation step and a recovery step. An auxiliary membrane module or set of modules is installed across a condenser and/or recovery unit on the downstream side of the main pervaporation unit. This module takes as its feed a stream from the recovery unit and returns a component-enriched stream to the inlet of the condenser or recovery unit. The module can be sized to produce a discharge stream containing the component in about the same concentration as the feed to be treated. This discharge stream can then be mixed with the feed without adverse effect on the efficiency of the system.

48 Claims, 6 Drawing Sheets

MEMBRANE PROCESS AND APPARATUS FOR REMOVING A COMPONENT FROM A FLUID STREAM This application is a continuation-in-part of U.S. patent application Ser. No. 635,919, "Membrane Process and Apparatus for Removing Vapors from Gas Streams", filed Dec. 28, 1990, now U.S. Pat. No. 5,071,451.

BACKGROUND OF THE INVENTION

Vapor Separation

Gas streams containing condensable vapors, such as water vapor, sulfur dioxide, ammonia or organic vapors, arise from numerous industrial and commercial processes. One method of removing the vapor from the gas stream is by means of a membrane separation step, followed by condensation of the vapor-enriched stream from the membrane separation step.

A typical membrane vapor separation system includes a membrane unit, a pump for lowering the pressure on the permeate side of the membrane, and a condenser for liquefying the vapor. Membrane processes for removing vapors from gas streams are described, for instance, in U.S. Pat. Nos. 3,903,694, 4,553,983 and 4,906,256, which all deal with removal of organic vapor from air or other gases, U.S. Pat. No. 4,444,571, which deals with removal of water vapor from gas streams, and U.S. Pat. Nos. 4,606,740 and 4,608,060, which describe membranes for removing polar gases such as hydrogen sulfide, sulfur dioxide and ammonia from other gases.

In a vapor removal process characterized by membrane separation followed by condensation, the vapor concentration in the condenser vent gas after the condensation step depends on the vapor/liquid equilibrium at the operating conditions under which the condensation is performed. It is frequently the case that the condenser vent gas contains a much higher concentration of vapor than the original feed gas. The vent gas is often recirculated to the feed side of the membrane unit for further treatment. This type of scheme, performed via an oven, is shown for example, in U.S. Pat. Nos. 4,553,983.

There are several problems associated with returning the condenser vent gas to the membrane feed. First, the more concentrated is the vent gas compared with the feed gas, the less efficient the system becomes. Suppose, for example, the feed gas contains 2% vapor, the vapor-enriched stream from the membrane separation step contains 20% vapor, and the vent gas from the condenser contains 10% vapor. Then about half of the amount of vapor removed and concentrated by the membrane is recirculated to the front of the membrane. Much of the separation achieved by membrane is then negated, resulting in increased membrane area and pump capacity requirements for the system.

What can be done to handle the condenser vent gas stream is to pass it to a second membrane stage. This stage can be designed to produce a discharge stream with a concentration about the same as the original feed, so as to minimize the impact of the recycled stream on the total process. The vapor-enriched stream from the second membrane stage is in turn condensed, and the vent gas from the second condenser is returned to the feed of the second membrane unit. Such an arrangement is shown, for example, in U.S. Pat. No. 4,906,256, FIG.

3. A two-stage system is complex compared with a one-stage, uses more controls and is more costly, since two sets of most components are needed.

Pervaporation

The discussion above concerns separations in which the feed to the membrane system is a gas or vapor. However, a similar situation obtains when components are removed from liquid streams by pervaporation. In pervaporation, the liquefied permeate may be subjected to recovery or further purification, by decantation, distillation, solvent extraction or adsorption, for example, and the impure, non-product stream from the decanter or other recovery unit may be passed to the feed side of the pervaporation unit for further treatment. This type of scheme is shown, for example, in U.S. Pat. No. 5,030,356. Mixing the non-product stream from the recovery unit with the raw, incoming feed solution can give rise to problems similar to those discussed above for gas or vapor separation.

SUMMARY OF THE INVENTION

The invention relates to an improved and advantageous arrangement of membrane modules that allows better performance of both vapor separation and pervaporation systems.

Vapor Separation

The invention is a vapor recovery system and process that permits condenser vent gas to be recirculated, using less energy and less membrane area than a one-stage membrane system, and without the complexity and cost of a two-stage system. In the system of the invention, a small auxiliary membrane module or set of modules is installed across the pump and condenser on the downstream side of the main membrane unit. This module takes as its feed the vent gas from the condenser, and returns a vapor-enriched stream upstream of the pump and condenser. If desired, the module can be sized to produce a discharge stream containing the vapor in about the same concentration as the feed to be treated. This discharge stream may then be mixed with the feed without adverse effect on the efficiency of the system.

Using the arrangement of the invention can achieve substantial improvements in the performance and efficiency of a conventional one-stage vapor removal system, without the necessity of resorting to a two-stage system, with attendant complications and cost.

In another aspect, the invention is a system and process that combines membrane vapor separation with any recovery system for the vapor. Besides condensation, the recovery process could be an extraction process, a physical or chemical absorption process or an adsorption process, for example. In each case, waste gas from the recovery process could be passed through the auxiliary module(s) before return to the main membrane unit or elsewhere.

Pervaporation

The invention is a system and process that combines pervaporation with any further recovery or purification method, such as decantation, distillation, extraction or adsorption. In each case, the non-product stream from the recovery or purification unit could be passed through an auxiliary membrane module, or set of modules, before returning to the main pervaporation unit or elsewhere.

In the pervaporation embodiments of the invention, the efficiency considerations may be different from those in the gas separation embodiments. The auxiliary module(s) may be installed across the condenser and the recovery unit on the downstream side of the main pervaporation unit. In this case, the driving force for membrane permeation in the auxiliary module(s) may be provided by the main condenser. Alternatively, the auxiliary module(s) may be installed across the recovery unit only and provided with their own driving force, most simply a second condenser. This arrangement can offer advantages over a one-stage or a two-stage system, particularly if a three-component feed liquid is to be treated.

It is an object of the invention to provide a process for removing vapors from gas streams.

It is an object of the invention to improve the performance of membrane vapor removal systems and processes.

It is an object of the invention to provide efficient membrane/condensation vapor removal processes in which the condenser vent gas is recirculated to the membrane unit.

It is an object of the invention to provide membrane/condensation vapor removal processes in which the condenser vent gas composition is adjusted.

It is an object of the invention to provide a pervaporation process.

It is an object of the invention to improve the performance of pervaporation systems and processes.

It is an object of the invention to provide efficient pervaporation/purification processes in which the non-product stream from the purification process is recirculated to the pervaporation unit.

It is an object of the invention to provide pervaporation/purification processes in which the composition of the non-product stream from the purification process is adjusted.

Other objects and advantages of the invention will be apparent from the description of the invention to those of ordinary skill in the art.

It is to be understood that the above summary and the following detailed description are intended to explain and illustrate the invention without restricting its scope.

DETAILED DESCRIPTION OF THE INVENTION

Vapor Separation

The term vapor as used herein refers to a liquefiable component of a gas stream.

In the process of the invention, a feed gas stream containing a vapor is passed through a membrane separation step and a recovery step. For convenience, the figures and their descriptions show a recovery step achieved by condensation of the vapor. However, other recovery steps, including various kinds of extraction, absorption and adsorption steps are also within the scope of the invention. The vapor may be of an organic compound or mixture of compounds, such as a hydrocarbon, a halogenated hydrocarbon or the like, or an inorganic compound, such as water, sulfur dioxide, ammonia, etc.

The other component or components of the feed gas stream may be other vapors, nitrogen, air or any other gas.

Figure 1:
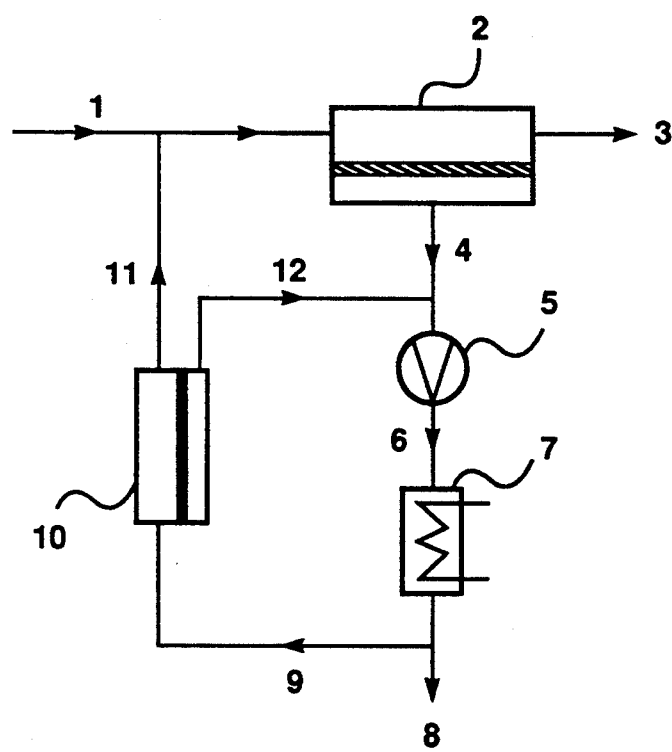
FIG. 1 is a schematic drawing showing a membrane separation process carried out with a system including a main membrane unit, a pump, a condenser and an auxiliary membrane module or modules.

A basic embodiment of the invention is shown in FIG. 1. Referring to this figure, a vapor-containing feed gas stream, 1, passes to a membrane separation unit, 2, containing one or more membranes. The membrane separation step normally involves running the feed gas stream across a membrane that is selectively permeable to the vapor that is to be removed. The vapor is concentrated in the stream, 4, permeating the membrane; the residue, non-permeating, stream, 3, is correspondingly depleted in vapor.

The membrane may take the form of a homogeneous membrane, a membrane incorporating a gel or liquid layer, or any other form known in the art. Two types of membrane are preferred for use in the invention. The first is a composite membrane comprising a microporous support, onto which the permselective layer is deposited as an ultrathin coating. Composite membranes are preferred when a rubbery polymer is used as the permselective material. The second is an asymmetric membrane in which the thin, dense skin of the asymmetric membrane is the permselective layer. Both composite and asymmetric membranes are known in the art. References that teach the production of such membranes include U.S. Pat. Nos. 4,243,701; 4,553,983; 4,230,463; and 4,840,646.

The form in which the membranes are used in the invention is not critical. They may be used, for example, as flat sheets or discs, coated hollow fibers, or spiral-wound modules, all forms that are known in the art. Spiral-wound modules are a preferred choice. References that teach the preparation of spiral-wound modules are S. S. Kremen, "Technology and Engineering of ROGA Spiral Wound Reverse Osmosis Membrane Modules", in Reverse Osmosis and Synthetic Membranes, S. Sourirajan (Ed.), National Research Council of Canada, Ottawa, 1977; and U.S. Pat. No. 4,553,983, column 10, lines 40–60. Alternatively the membranes may be configured as microporous hollow fibers coated with the permselective polymer material and then potted into a module.

The driving force for membrane permeation is the pressure difference between the feed and permeate sides. The pressure drop across the membrane can be achieved by pressurizing the feed, by evacuating the permeate or by both. In FIG. 1, the feed gas is supplied to the membrane separation unit at atmospheric pressure or slightly above, and a vacuum pump, 5, is used to lower the pressure on the permeate side.

Stream, 6, from the vacuum pump is subjected to a condensation step. In general, the condensation step may involve chilling, compression or a combination of these. In FIG. 1, the vapor-enriched stream passes without compression to condenser, 7. The condenser may be water cooled, or may employ refrigerants that can take the gas down to lower temperatures, and produces a stream, 8, of liquified vapor.

The amount of vapor that can be removed from the vapor-enriched stream by condensation depends on the vapor concentration, the vapor/liquid equilibrium and the operating conditions under which the condensation is performed. In practice, the economics of achieving extremely high pressures and extremely low temperatures usually limit the performance of the condensation step in recovering liquified vapor. There are also constraints on the removal or recovery achieved by the other types of removal processes.

The non-condensed gas fraction, 9, emerging from the condenser contains a higher vapor concentration than the feed gas, and may contain a concentration as high as five times, 10 times or more than the feed concentration. This condenser vent gas is passed through an auxiliary membrane module or modules, 10, which, like the main membrane separation unit, normally contains a vapor-selective membrane. The volume of the condenser vent gas stream is much smaller than that of the feed gas stream, so the membrane area required for the auxiliary module is small compared with the main unit. The auxiliary module, 10, is connected on its permeate side upstream of the vacuum pump, 6. Thus the driving force for auxiliary membrane permeation is provided by the pressure difference between the vacuum and exhaust sides of the vacuum pump. The concentrated vapor stream, 12, from the auxiliary module joins with vapor-enriched stream, 4, from the main membrane unit and passes again through the vacuum pump and condenser. The residue stream, 11, from the auxiliary unit is recirculated to the feed side of the main membrane unit. The concentration of vapor in the stream 11 depends on the membrane area contained in the auxiliary module. Preferably, the membrane area is such that there is not a big difference between the vapor concentrations in streams 11 and 1. Most preferably, stream 11 should have a concentration about the same as stream 1.

Figure 2:
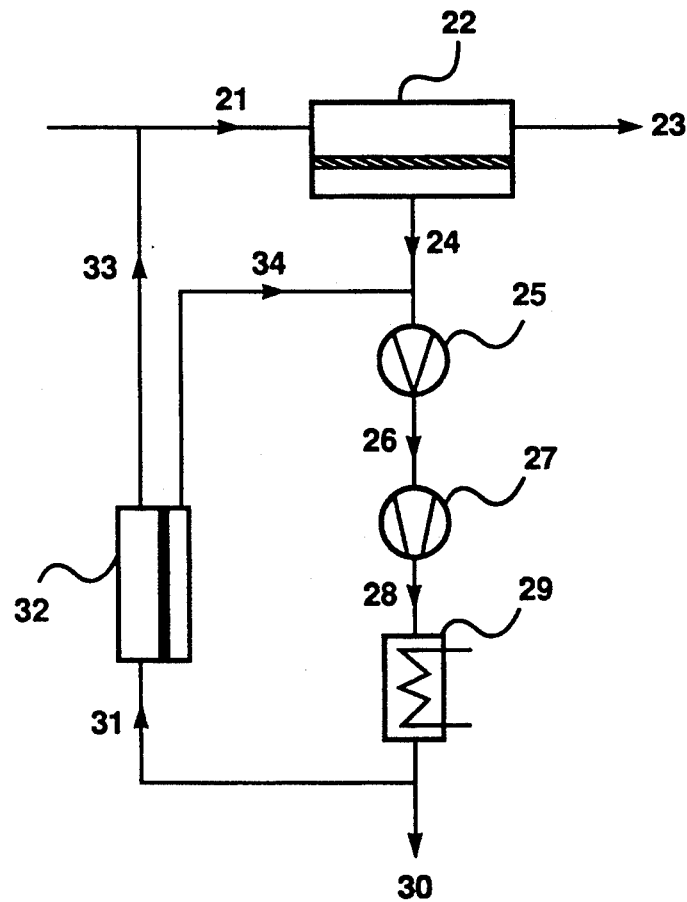
FIG. 2 is a schematic drawing showing a membrane separation process carried out with a system including a main membrane unit, a pump, a compressor, a condenser and an auxiliary membrane module or modules.

An alternative embodiment of the invention is shown in FIG. 2. Referring now to this figure, a vapor-containing feed gas stream, 21, passes to a membrane separation unit, 22, containing one or more membranes. The vapor is concentrated in stream, 24, permeating the membrane; the residue, non-permeating, stream, 23, is correspondingly depleted in vapor.

As in FIG. 1, the driving force for membrane permeation is provided by a vacuum pump, 25, which is used to lower the pressure on the permeate side. Stream, 26, from the vacuum pump is subjected to a condensation step. In this case, the condensation step involves both compression and chilling. The vapor-enriched stream, 26, passes to compressor, 27, emerging as pressurized stream, 28. It is then condensed in condenser, 29, and produces a stream, 30, of liquified vapor.

The non-condensed gas fraction, 31, is passed through an auxiliary membrane module or modules, 32, connected on its permeate side as in FIG. 1, that is, upstream of the vacuum pump, 25. The driving force for auxiliary membrane permeation is provided by the pressure difference between the pressurized exhaust from the condenser and the low-pressure side of the vacuum pump. The concentrated vapor stream, 34, from the auxiliary module joins with vapor-enriched stream, 24, from the main membrane unit and passes again through the vacuum pump, compressor and condenser. The residue stream, 33, from the auxiliary unit is recirculated to the feed side of the main membrane unit. The concentration of vapor in stream 33 may be tailored as discussed above. In this configuration, it would also be possible, although less desirable, to return stream 34 between the vacuum pump and compressor, so that it joined with stream 26.

Figure 3:
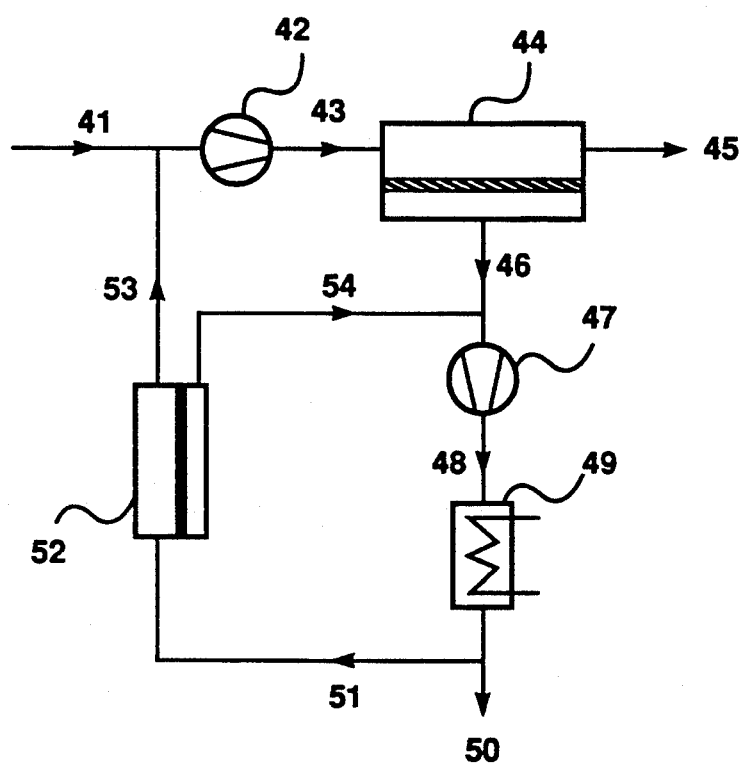
FIG. 3 is a schematic drawing showing a membrane separation process carried out with a system including a compressor, a main membrane unit, a condenser and an auxiliary membrane module or modules.

A third possible embodiment of the invention is shown in FIG. 3. This arrangement differs from those of FIG. 1 and FIG. 2 in that the feed gas stream is supplied to the main membrane unit at high pressure, so it is possible to operate at atmospheric pressure on the permeate side. Referring now to FIG. 3, a vapor-containing feed gas stream, 41, passes to a compressor, 42. Preferably, this raises the feed gas pressure to a value in the range of 1–20 atmospheres. Pressurized feed gas stream, 43, then passes to membrane separation unit, 44, containing one or more membranes. The vapor is concentrated in stream, 46, permeating the membrane; the residue, non-permeating, stream, 45, is correspondingly depleted in vapor.

In this case, the driving force for membrane permeation is provided by the pressurized feed; the permeate side of the membrane is at, or close to, atmospheric pressure. Stream, 46, from the membrane passes to compressor, 47, emerging as pressurized stream, 48. It is then condensed in condenser, 49, and produces a stream, 50, of liquified vapor.

The non-condensed gas fraction, 51, is passed through an auxiliary membrane module or modules, 52, connected on its permeate side upstream of compressor, 47. The driving force for auxiliary membrane permeation is provided by the pressure difference between the pressurized exhaust from the condenser and the low-pressure side of the compressor. The concentrated vapor stream, 54, from the auxiliary module joins with vapor-enriched stream, 46, from the main membrane unit and passes again through the compressor and condenser. The residue stream, 53, from the auxiliary unit is recirculated to the feed side of the main membrane unit. The concentration of vapor in stream 53 may be tailored as discussed above.

From the above discussion it may be seen that various ways of providing the driving force for membrane permeation in the main and auxiliary membrane units are possible within the scope of the invention. What is required is that there be some component or set of components on the permeate side of the main membrane unit that changes the pressure of the gas stream passing through it, such as any type of pump, compressor, eductor or the like. What is further required is that at least part of the pressure change caused by that component or components is tapped to provide the driving means for the auxiliary module(s).

FIGS. 1, 2 and 3 all show a one-stage main membrane unit. However, it will be apparent that the same principle can be applied where the main membrane unit includes multiple membrane stages or steps, such as a two-step system, a two-stage system or other combinations.

FIGS. 1, 2 and 3 all show processes in which the residue stream from the auxiliary module(s) is recirculated to the feed side of the main membrane unit. Embodiments in which the residue stream passes to some other destination are also contemplated. In this case, the auxiliary module(s) can be tailored to achieve a residue stream concentration appropriate to that destination.

Pervaporation

Figure 5:
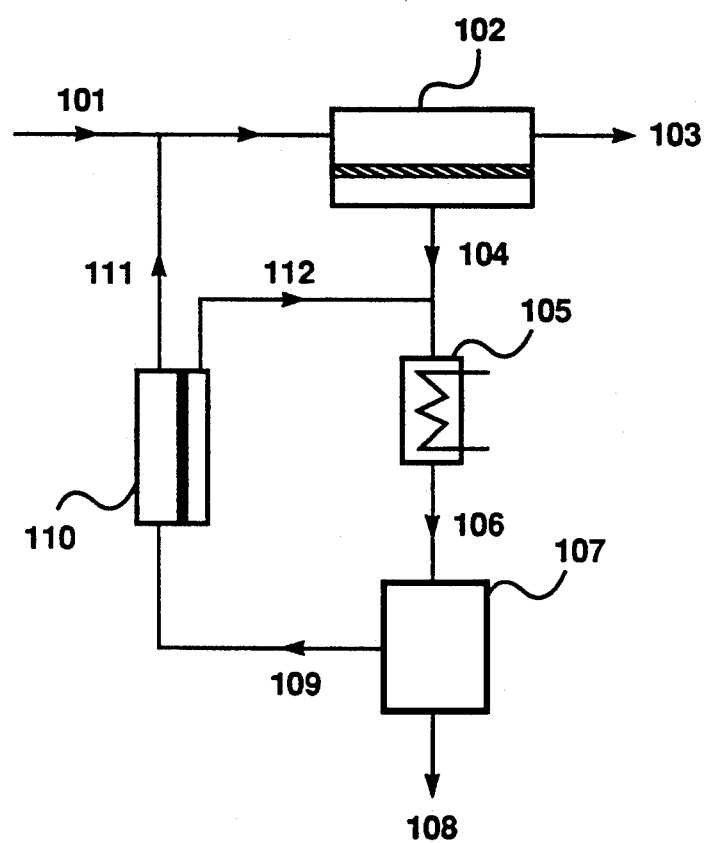
FIG. 5 is a schematic drawing showing a pervaporation/purification process carried out with a system including a main pervaporation unit, a condenser, a recovery or further purification unit and an auxiliary membrane module or modules.
Figure 6:
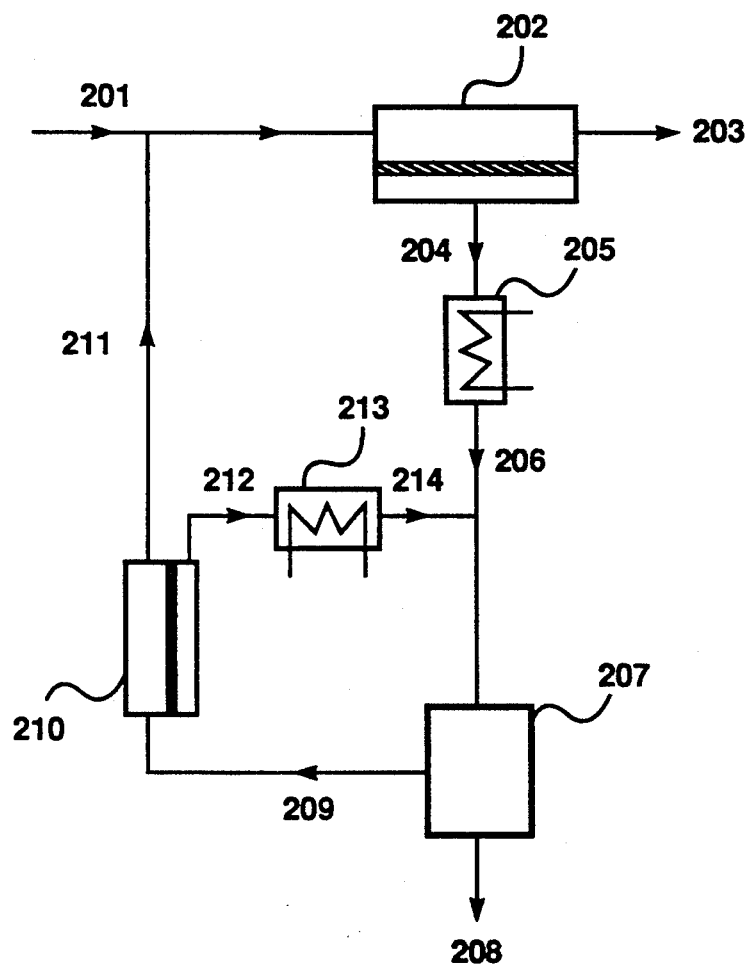
FIG. 6 is a schematic drawing showing a pervaporation/purification process carried out with a system including a main pervaporation unit, a condenser, a recovery or further purification unit, an auxiliary membrane module or modules and a second condenser.

FIGS. 5 and 6 show embodiments of the invention as it relates to pervaporation. A convenient mathematical method of describing pervaporation is to divide the separation into two steps. The first is evaporation of the feed liquid to form a hypothetical saturated vapor phase on the feed side of the membrane. The second is permeation of this vapor through the membrane to the low pressure permeate side of the membrane. Although no evaporation actually takes place on the feed side of the membrane during pervaporation, this approach is mathematically simple and is thermodynamically completely equivalent to the physical process.

In pervaporation, transmembrane permeation is induced by maintaining the vapor pressure on the permeate side lower than the vapor pressure of the feed liquid. The permeate side vapor pressure can be reduced, for example, by drawing a vacuum on the permeate side of the membrane, by sweeping the permeate side to continuously remove permeating vapor, or by cooling the permeate vapor stream to induce condensation. The feed solution may also be heated to raise the vapor pressure on the feed side.

FIG. 5 shows a pervaporation embodiment that corresponds to the gas separation embodiment of FIG. 1. In FIG. 1, the driving force is provided by the pump. The condenser provides a recovery step from which the purified condensate is removed and the impure, non-condensed fraction passes to the auxiliary module(s). The pervaporation system of FIG. 5 differs from the gas separation design of FIG. 1 in that the condenser provides a driving force for transmembrane permeation and the recovery or further purification is provided by a decanter, distillation column, adsorbent bed, extraction process or the like. Referring now to FIG. 5, a solution, 101, containing a component to be separated, passes to a pervaporation unit, 102, containing one or more membranes. Preferably, although not essentially, solution 101 is warmed before entering the pervaporation unit to raise the vapor pressure on the feed side and augment the driving force provided by the condenser. The pervaporation step normally involves running the feed solution across a membrane that is selectively permeable to the component that is to be removed. That component is concentrated in the vapor stream, 104, permeating the membrane; the residue, non-permeating, stream, 103, is correspondingly depleted in the component.

As with the gas separation designs, the membrane may take any of the membrane forms known in the art. For pervaporation, composite membranes, asymmetric membranes or ion-exchange membranes are preferred. For separating an organic compound from water, the following membrane materials, among others, might be used: nitrile rubber, neoprene, polydimethylsiloxane (silicone rubber), chlorosulfonated polyethylene, polysilicone-carbonate copolymers, fluoroelastomers, plasticized polyvinylchloride, polyurethane, cis-polybutadiene, cis-polyisoprene, poly(butene-1), polystyrene-butadiene copolymers, styrene/butadiene/styrene block copolymers, styrene/ethylene/butylene block copolymers, polyesteramides, and block copolymers of polyethers and polyesters. For separating water from an organic compound, the following membrane materials, among others, might be used: polyvinylalcohol, cellulose and derivatives, such as cellulose diacetate, cellulose triacetate, cellulose nitrate and ethylcellulose, chitosan, crosslinked alginic acid, and ion-exchange membranes, such as the Nafion range from Du Pont. For separating two organic compounds, the following membrane materials, among others, might be used: polyamides, cellulose and derivatives, such as cellulose diacetate, cellulose triacetate, cellulose nitrate and ethylcellulose.

For pervaporation, the form of the module containing the membrane may be any of the forms known in the membrane separation arts, including, for example, plate-and-frame modules, hollow-fiber modules and spiral-wound modules. Plate-and-frame module design and construction is discussed, for example, in U.S. Pat. No. 4,695,380. The preparation of spiral-wound modules is described, for example, in U.S. Pat. No. 3,966,616. The preparation of hollow-fiber membranes and modules is described, for example, in U.S. Pat. Nos. 3,798,185 and 4,230,463.

In FIG. 5, the driving force for transmembrane permeation is provided by condenser, 105, which liquifies the permeating vapor and thereby maintains a low partial pressure on the permeate side. Liquid stream, 106, from the condenser passes to the recovery, second separation or further purification unit, 107. A variety of techniques can be used to further purify the condensed permeate. If the content of the permeate and the mutual solubilities of the components are appropriate, the permeate may form two phases, for example an aqueous phase and an organic phase. Further purification could then be achieved by separating the two phases in a decanter. If the permeate forms a single phase, it can be further separated by distillation, adsorption or solvent extraction, for example. In FIG. 5, stream 108 represents the stream rich in the desired component; stream 109 represents the residual, non-product stream. For example, if the purpose of the pervaporation/further purification process were to separate an organic compound from water, stream 108 would be the organic-rich stream and stream 109 would be the residual aqueous stream. As in the gas separation applications described above, the composition of stream 109 may be very different from that of incoming feed stream 101. Stream 109 may be saturated with organic, for example.

The non-product stream, 109, is passed through an auxiliary pervaporation module or modules, 110. Preferably, before entering the module, stream 109 is heated to increase the feed side vapor pressure. This may be done by running stream 109 through a heat exchanger in heat-exchanging contact with, for example, stream 103. The auxiliary module, 110, is connected on its permeate side upstream of the condenser, 105. Thus a driving force for auxiliary membrane permeation is provided by the condenser. The concentrated vapor stream, 112, from the auxiliary module passes, together with stream 104 or separately, through the condenser and the further purification process. The residue stream, 111, from the auxiliary unit is recirculated to the feed side of the main membrane unit. The composition of stream 111 depends on the membrane area contained in the auxiliary module. Preferably, the membrane area is such that there is not a big difference between the compositions of streams 111 and 101. Most preferably, stream 111 should have a concentration about the same as stream 101.

In addition to the basic elements shown in FIG. 5, a prevaporation system commonly includes a small vacuum pump, on the permeate side, to remove any non-condensable gas that may be present in the system. The system may also include a pump to pump the condensed permeate to the recovery or further purification unit, 107, and a pump to pump the non-product stream from the recovery unit to the auxiliary module or modules.

An alternative embodiment of the invention as it relates to pervaporation is shown in FIG. 6. The pervaporation system of FIG. 6 differs from that of FIG. 5 in that a separate condenser is used to drive the auxiliary modules, but the recovery or further purification unit handles the condensates from both condensers. Other optional equipment, such as pumps to remove noncondensable gas and to supply liquid to the recovery unit may serve both condensers. Less desirably, separate pumps may be provided to handle each condenser.

Referring now to FIG. 6, a solution, 201, containing a component to be separated, passes to a pervaporation unit, 202, containing one or more membranes. The pervaporation step normally involves running the feed solution across a membrane that is selectively permeable to the component that is to be removed. That component is concentrated in the vapor stream, 204, permeating the membrane; the residue, non-permeating, stream, 203, is correspondingly depleted in the component. As with the embodiment of FIG. 5, the solution may be heated before entering the pervaporation unit.

The membranes and modules may be chosen and configured according to the same teachings as given for the FIG. 5 embodiment. A driving force for transmembrane permeation is provided by condenser, 205, which liquefies the permeating vapor and thereby maintains a low partial pressure on the permeate side. Liquid stream, 206, from the condenser passes to the recovery or further purification unit, 207, which, as in FIG. 5, may be a decanter, distillation column, etc. Stream 208 represents the stream rich in the desired component; stream 209 represents the non-product stream. Stream 209 is passed through an auxiliary pervaporation module or modules, 210. Preferably, before entering the module, stream 209 is heated to increase the feed side vapor pressure. This may be done by running stream 209 through a heat exchanger in heat-exchanging contact with, for example, stream 203. The auxiliary module, 210, is connected on its permeate side to auxiliary condenser, 213. The concentrated vapor stream, 212, from the auxiliary module passes through condenser, 213, emerging as liquid stream, 214, which in turn passes, together with stream 206 or separately, to the recovery or further purification unit, 207. The residue stream, 211, from the auxiliary unit is recirculated to the feed side of the main membrane unit. The design of FIG. 6 is particularly useful when the feed liquid contains three components of differing physical properties, such as a hydrophobic organic compound, an organic compound moderately soluble in water, and water.

FIGS. 5 and 6 show a one-stage pervaporation unit. However, it will be apparent that the same principle can be applied where the main pervaporation unit includes multiple membrane stages or steps, such as a two-step system, a two-stage system or other combinations.

FIGS. 5 and 6 show processes in which the residue stream from the auxiliary module(s) is recirculated to the feed side of the main membrane unit. Embodiments in which the residue stream passes to some other destination are also contemplated. In this case, the auxiliary module(s) can be tailored to achieve a residue stream concentration appropriate to that destination.

FIGS. 5 and 6 show systems and processes in which a driving means for transmembrane permeation, equivalent to the pressure-changing means of the vapor separation embodiments, is provided by the condenser on the permeate side of the pervaporation unit, optionally augmented by heating the feed stream. Embodiments in which the driving force is provided by a vacuum pump instead of a condenser on the permeate side, a vacuum pump combined with a condenser, an eductor or any other means that would cause transmembrane permeation to occur are also within the scope of the invention.

In preferred embodiments, the membranes used in the main pervaporation unit and the auxiliary modules are of the same type, selective to the component that is to be separated. However, useful embodiments are also possible using membranes of unlike selectivities in the main unit and the auxiliary modules.

Representative Applications

The systems and processes of the invention could be used for diverse applications, including:

1. Removal of hydrocarbons, particularly $C_3$ to $C_6$ hydrocarbons, from gas streams emitted during storage or transfer of crude oil or gasoline.

2. Removal of CFCs (chlorofluorocarbons) or HCFCs from streams emitted from refrigeration or air conditioning plants, foam manufacture, processes that use CFCs as solvents, CFC manufacture, storage or transfer.

3. Removal of chlorinated solvents from streams generated during chemical manufacture and processing operations, film and laminate preparation, coating and spraying, solvent degreasing, industrial and commercial dry cleaning and many other sources.

4. Removal of organic compounds, particularly volatile organic compounds (VOCs) from industrial wastewaters or process waters.

5. Separation of closely boiling mixtures or azeotropes.

6. Removal of small quantities of water from alcohols and other organic liquids.

7. Clean up of groundwater contamination.

8. Treatment of industrial waste streams containing mixtures of hydrophobic and/or volatile organic compounds (VOCs), particularly halogenated hydrocarbons or aromatic hydrocarbons, with water miscible, less volatile (hydrophilic) solvents.

The invention is now further illustrated by the following examples, which are intended to be illustrative of the invention, but are not intended to limit the scope or underlying principles in any way.

EXAMPLES

Vapor Separation Examples

Examples 1-3 compare the removal of a condensable vapor from a feed stream using (A) a one-stage membrane system and (B) a one-stage system fitted with an auxiliary module or modules. The examples are computer calculations, performed using a computer program based on the gas permeation equations for cross flow conditions described by Shindo et al., "Calculation Methods for Multicomponent Gas Separation by Permeation," *Sep. Sci. Technol.* 20, 445-459 (1985). In each case, the feed stream has a flow rate of 100 scfm and the feed is provided to the main membrane separation unit at a pressure of 80 cmHg. The driving force for membrane permeation is assumed to be a vacuum pump on the permeate side of the main membrane separation unit. The selectivity of the membranes for the vapor over the other components of the feed is assumed to be 40. This is a number typical of many vapor separations, such as hydrocarbons from air or nitrogen, chlorinated or fluorinated organic solvents from air or nitrogen, sulfur dioxide from nitrogen, oxygen or other gases, and so on.

The examples are in three groups. The Group I examples assume a feed concentration of 2% vapor and a concentration in the residue leaving the main membrane unit of 0.5%, in other words 75% removal. The Group 2 examples also achieve 75% removal, from 4% vapor in the feed to 1% in the residue. The Group 3 examples achieve 90% recovery, from 5% vapor in the feed to 0.5% in the residue. In each case, the condenser vent gas is assumed to contain 20% vapor, and the auxiliary module membrane area is tailored to achieve a residue stream having a vapor concentration about the same as that of the feed.

GROUP 1 EXAMPLES

EXAMPLE A

Single-stage membrane separation unit. Not in accordance with the invention.

The calculations described above were performed using the following assumptions:

| Feed concentration: | 2% vapor |
|---|---|
| Feed pressure: | 80 cmHg |
| Feed flow rate: | 100 scfm |
| Membrane selectivity: | 40 |
| Residue concentration: | 0.5% |
| Condenser vent gas concentration: | 20% |

The pressure on the permeate side of the main membrane unit was set to 2 cmHg, 5 cmHg and 10 cmHg. The calculated membrane areas and pump capacities required to achieve the desired performance with a one-stage membrane system are listed in Table 1.

TABLE 1

| Permeate Pressure (cmHg) | Main Unit ($m^2$) | Aux. Module ($m^2$) | Total ($m^2$) | Pump Capacity (acfm) |
|---|---|---|---|---|
| 10 | 430 | — | 430 | 494 |
| 5 | 163 | — | 163 | 412 |
| 2 | 72 | — | 72 | 505 |

EXAMPLE B

Single-stage Membrane Separation Unit with Auxiliary Modules

The calculations described in Example 1A were repeated using a system design as in FIG. 1. The assumptions were as before:

| Feed concentration: | 2% vapor |
|---|---|
| Feed pressure: | 80 cmHg |
| Feed flow rate: | 100 scfm |
| Membrane selectivity: | 40 |
| Residue concentration: | 0.5% |
| Condenser vent gas concentration: | 20% |
| Permeate pressure: | 2 cmHg, 5 cmHg and 10 cmHg |

The calculated membrane areas and pump capacities required to achieve the desired performance with a system design as in FIG. 1 are listed in Table 2.

TABLE 2

| Permeate Pressure (cmHg) | Main Unit ($m^2$) | Aux. Module ($m^2$) | Total ($m^2$) | Pump Capacity (acfm) |
|---|---|---|---|---|
| 10 | 207 | 64 | 271 | 315 |
| 5 | 98 | 15 | 113 | 294 |
| 2 | 50 | 5 | 55 | 401 |

Comparison of Tables 1 and 2 shows that, when the permeate pressure is 10 cmHg for example, the membrane area needed for the process and system of the invention is only 63% of that needed for a conventional one-stage system, and the pump capacity is only 64%. Likewise, when the permeate pressure is 5 cmHg, the membrane area needed for the process and system of the invention is 69% of that needed for a conventional one-stage system, and the pump capacity is 71%. When the permeate pressure is 2 cmHg, the membrane area needed for the process and system of the invention is 76% of that needed for a conventional one-stage system, and the pump capacity is 79%.

Figure 4:
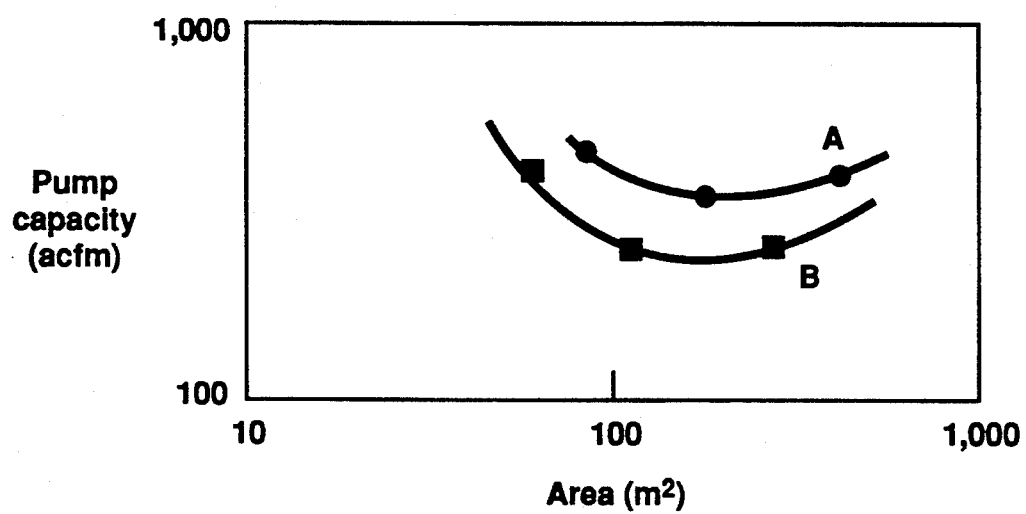
FIG. 4 is a graph showing membrane area and pump capacity required to reduce the vapor concentration in a feed stream from 2% to 0.5% by means of a one-stage membrane process (curve A) and a one-stage process with auxiliary module (curve B).

The comparison of membrane areas and pump capacities for a one-stage system and process (curve A) and for the system and process of the invention (curve B) is shown in graph form in FIG. 4.

GROUP 2 EXAMPLES

EXAMPLE A

Single-stage Membrane Separation Unit. Not in accordance with the invention.

Calculations were performed as in Example 1A, but using the following assumptions:

| Feed concentration: | 4% vapor |
|---|---|
| Feed pressure: | 80 cmHg |
| Feed flow rate: | 100 scfm |
| Membrane selectivity: | 40 |
| Residue concentration: | 1% |
| Condenser vent gas concentration: | 20% |
| Permeate pressure: | 2 cmHg, 5 cmHg, 10 cmHg |

The calculated membrane areas and pump capacities required to achieve the desired performance with a one-stage membrane system are listed in Table 3.

TABLE 3

| Permeate Pressure (cmHg) | Membrane Area Main Unit (m²) | Aux. Module (m²) | Total (m²) | Pump Capacity (acfm) |
|---|---|---|---|---|
| 10 | 291 | — | 291 | 350 |
| 5 | 114 | — | 114 | 318 |
| 2 | 54 | — | 54 | 452 |

EXAMPLE B

Single-Stage Membrane Separation Unit with Auxiliary Modules

The calculations described in Example 2A were repeated using a system design as in FIG. 1. The assumptions were as before:

| | |
|---|---|
| Feed concentration: | 4% vapor |
| Feed pressure: | 80 cmHg |
| Feed flow rate: | 100 scfm |
| Membrane selectivity: | 40 |
| Residue concentration: | 1% |
| Condenser vent gas concentration: | 20% |
| Permeate pressure: | 2 cmHg, 5 cmHg and 10 cmHg |

The calculated membrane areas and pump capacities required to achieve the desired performance with a system design as in FIG. 1 are listed in Table 4.

TABLE 4

| Permeate Pressure (cmHg) | Membrane Area Main Unit (m²) | Aux. Module (m²) | Total (m²) | Pump Capacity (acfm) |
|---|---|---|---|---|
| 10 | 192 | 36 | 228 | 278 |
| 5 | 88 | 9 | 97 | 278 |
| 2 | 46 | 3 | 49 | 414 |

Comparison of Tables 3 and 4 shows that, when the permeate pressure is 10 cmHg for example, the membrane area needed for the process and system of the invention is only 78% of that needed for a conventional one-stage system, and the pump capacity is only 79%. Likewise, when the permeate pressure is 5 cmHg, the membrane area needed for the process and system of the invention is 85% of that needed for a conventional one-stage system, and the pump capacity is 87%. When the permeate pressure is 2 cmHg, the membrane area needed for the process and system of the invention is 90% of that needed for a conventional one-stage system, and the pump capacity is 91%.

GROUP 3 EXAMPLES

EXAMPLE A

Single-stage Membrane Separation Unit. Not in accordance with the invention.

Calculations were performed as in Example 1A, but using the following assumptions:

| | |
|---|---|
| Feed concentration: | 5% vapor |
| Feed pressure: | 80 cmHg |
| Feed flow rate: | 100 scfm |
| Membrane selectivity: | 40 |
| Residue concentration: | 0.5% |
| Condenser vent gas concentration: | 20% |
| Permeate pressure: | 1 cmHg, 2 cmHg, 5 cmHg, 10 cmHg |

The calculated membrane areas and pump capacities required to achieve the desired performance with a one-stage membrane system are listed in Table 5.

TABLE 5

| Permeate Pressure (cmHg) | Membrane Area Main Unit (m²) | Aux. Module (m²) | Total (m²) | Pump Capacity (acfm) |
|---|---|---|---|---|
| 10 | 441 | — | 441 | 527 |
| 5 | 179 | — | 179 | 496 |
| 2 | 87 | — | 87 | 711 |
| 1 | 65 | — | 65 | 1155 |

EXAMPLE B

Single-Stage Membrane Separation Unit with Auxiliary Modules

The calculations described in Example 3A were repeated using a system design as in FIG. 1. The assumptions were as before:

| | |
|---|---|
| Feed concentration: | 5% vapor |
| Feed pressure: | 80 cmHg |
| Feed flow rate: | 100 scfm |
| Membrane selectivity: | 40 |
| Residue concentration: | 0.5% |
| Condenser vent gas concentration: | 20% |
| Permeate pressure: | 1 cmHg, 2 cmHg, 5 cmHg and 10 cmHg |

The calculated membrane areas and pump capacities required to achieve the desired performance with a system design as in FIG. 1 are listed in Table 6.

TABLE 6

| Permeate Pressure (cmHg) | Membrane Area Main Unit (m²) | Aux. Module (m²) | Total (m²) | Pump Capacity (acfm) |
|---|---|---|---|---|
| 10 | 340 | 50 | 390 | 470 |
| 5 | 152 | 11 | 163 | 454 |
| 2 | 78 | 4 | 82 | 673 |
| 1 | 59 | 3 | 62 | 1111 |

Comparison of Tables 5 and 6 shows that, when the permeate pressure is 10 cmHg for example, the membrane area needed for the process and system of the invention is 88% of that needed for a conventional one-stage system, and the pump capacity is 89%. When the permeate pressure is 5 cmHg, the membrane area needed for the process and system of the invention is 91% of that needed for a conventional one-stage system, and the pump capacity is 91%. When the permeate pressure is 2 cmHg or 1 cmHg, the membrane area needed for the process and system of the invention is about 95% of that needed for a conventional one-stage system, and the pump capacity is 95%.

Comparing Examples 1B, 2B and 3B, it may be seen that the greatest savings in membrane area and pump capacity is achieved when there is the greatest disparity between the vapor concentration in the condensor vent gas and the feed gas.

Prevaporation Examples

Examples 4, 5 and 6 concern pervaporation. Example 4 compares the performance that can be achieved using (A) a one-stage pervaporation unit followed by a decanter and (B) a one-stage pervaporation unit fitted with an auxiliary module or modules across the condenser and the recovery unit as shown in FIG. 5. Example 5 compares the performance that can be achieved using (A) a one-stage pervaporation unit and (B) a one-stage pervaporation unit fitted with an auxiliary module or modules across the recovery unit as shown in FIG. 6. Example 6 demonstrates the use of unlike membranes in the main pervaporation unit and the auxiliary modules.

EXAMPLE 4

EXAMPLE A

Single-stage pervaporation unit not in accordance with the invention.

Performance calculations were carried out to determine the performance of a conventional one-stage pervaporation system, followed by a decanter, in separating benzene from water. The separation factor chosen is typical for the separation of hydrophobic organic compounds from water. The calculations were done using the following assumptions:

| | |
|---|---|
| Raw solution concentration: | 20 ppm, 5 ppm and 1 ppm |
| Raw solution flow rate: | 1,000 kg/h |
| Membrane area: | 10 $m^2$ |
| Membrane separation factor: | 465 |
| Transmembrane flux: | 1 kg/$m^2 \cdot$ h |
| Condenser temperature: | 5° C. |
| Feed liquid temperature: | 60° C. |

In each case, the condensed permeate stream is passed to the decanter for phase separation. The aqueous phase from the decanter is saturated with benzene at a concentration of 2,000 ppm and is returned at a rate of 10 kg/h and mixed with the incoming raw solution to form a mixed feed to the pervaporation unit. The separation performance achieved at different raw feed concentrations is listed in Table 7.

TABLE 7

| Raw solution concentration (ppm) | Residue stream concentration (ppm) | Mixed membrane feed concentration (ppm) | Removal (%) |
|---|---|---|---|
| 20 | 0.4 | 40 | 98 |
| 5 | 0.25 | 25 | 95 |
| 1 | 0.21 | 21 | 79 |

EXAMPLE B

Single-stage pervaporation unit with auxiliary modules

The calculations described in Example 4A were repeated using a system design as in FIG. 5. The assumptions were as before:

| | |
|---|---|
| Raw solution concentration: | 20 ppm, 5 ppm and 1 ppm |
| Raw solution flow rate: | 1,000 kg/h |
| Main unit membrane area: | 10 $m^2$ |
| Membrane separation factor: | 465 |
| Transmembrane flux: | 1 kg/$m^2 \cdot$ h |
| Condenser temperature: | 5° C. |
| Feed liquid temperature: | 60° C. |

In addition, it was assumed that the auxiliary module as shown in FIG. 5 contains a membrane area of 0.1 $m^2$, so that the total membrane area used for the separation is 10.1 $m^2$. In each case, the condensed permeate stream from the main pervaporation unit is passed to the decanter for phase separation. The aqueous phase from the decanter is saturated with benzene at a concentration of 2,000 ppm and is passed to the auxiliary module. The permeate from the auxiliary module is passed to the condenser and thence to the decanter. The residue from the auxiliary module is reduced to a concentration of 20 ppm and mixed with the incoming raw solution to form the mixed feed to the pervaporation unit. The separation performance achieved at different raw feed concentrations is listed in Table 8.

TABLE 8

| Raw solution concentration (ppm) | Residue stream concentration (ppm) | Mixed membrane feed concentration (ppm) | Removal (%) |
|---|---|---|---|
| 20 | 0.2 | 20 | 99 |
| 5 | 0.052 | 5.15 | 98.9 |
| 1 | 0.012 | 1.2 | 98.8 |

Comparison of Tables 7 and 8 shows that the separation performance of the system of the invention is improved compared with the performance of a conventional one-stage pervaporation unit followed by a decanter. The improvement is most marked at low feed concentrations. When the raw solution has a benzene concentration of only 1 ppm, the effect of mixing the saturated aqueous stream from the decanter is to increase the concentration of the feed to the pervaporation unit to 21 ppm. The residue stream increases in concentration, therefore, to 0.21 ppm. In other words, the removal of benzene from the raw solution is only 79%. Using the design of the invention, the feed concentration is only raised from 1 ppm to 1.2 ppm and a removal of 98.8% can be sustained. Similar, but less marked effects are observed at higher raw solution concentrations.

EXAMPLE 5

EXAMPLE A

Single-stage pervaporation unit not in accordance with the invention.

Performance calculations were carried out to determine the performance of a conventional one-stage pervaporation system followed by a decanter in separating benzene from water. The separation factor chosen is typical for the separation of hydrophobic organic compounds from water. The calculations were done using the following assumptions:

| | |
|---|---|
| Raw solution concentration: | 20 ppm, 5 ppm and 1 ppm |
| Raw solution flow rate: | 1,000 kg/h |
| Membrane area: | 10 $m^2$ |
| Membrane separation factor: | 465 |
| Transmembrane flux: | 1 kg/$m^2 \cdot$ h |
| Condenser temperature: | 5° C. |
| Feed liquid temperature: | 60° C. |

In each case, the condensed permeate stream is passed to the decanter for phase separation. The aqueous phase from the decanter is saturated with benzene at a concentration of 2,000 ppm and is returned at a rate of 10 kg/h and mixed with the incoming raw solution to form a mixed feed to the pervaporation unit. The separation performance achieved by the system at different raw feed concentrations is listed in Table 9.

TABLE 9

| Raw solution concentration (ppm) | Residue stream concentration (ppm) | Mixed membrane feed concentration (ppm) | Removal (%) |
|---|---|---|---|
| 20 | 0.4 | 40 | 98 |
| 5 | 0.25 | 25 | 95 |

TABLE 9-continued

| Raw solution concentration (ppm) | Residue stream concentration (ppm) | Mixed membrane feed concentration (ppm) | Removal (%) |
| --- | --- | --- | --- |
| 1 | 0.21 | 21 | 79 |

Example B

Single-stage pervaporation unit with auxiliary modules

The calculations described in Example 5A were repeated using a system design as in FIG. 6. The assumptions were as before:

| | |
| --- | --- |
| Raw solution concentration: | 20 ppm, 5 ppm and 1 ppm |
| Raw solution flow rate: | 1,000 kg/h |
| Main unit membrane area: | 10 m$^2$ |
| Membrane separation factor: | 465 |
| Transmembrane flux: | 1 kg/m$^2$ · h |
| Condenser temperature: | 5° C. |
| Feed liquid temperature: | 60° C. |

In addition, it was assumed that the auxiliary module as shown in FIG. 6 contains a membrane area of 0.1 m$^2$, so that the total membrane area used for the separation is 10.1 m$^2$. In each case, the condensed permeate stream from the main pervaporation unit is passed to the decanter for phase separation. The aqueous phase from the decanter is saturated with benzene at a concentration of 2,000 ppm and is passed to the auxiliary module. The permeate from the auxiliary module is passed to an auxiliary condenser and thence to the decanter. The residue from the auxiliary module is reduced to a concentration of 20 ppm and mixed with the incoming raw solution to form the mixed feed to the pervaporation unit. The separation performance achieved by the system at different raw feed concentrations is listed in Table 10.

TABLE 10

| Raw solution concentration (ppm) | Residue stream concentration (ppm) | Mixed membrane feed concentration (ppm) | Removal (%) |
| --- | --- | --- | --- |
| 20 | 0.2 | 20 | 99 |
| 5 | 0.052 | 5.15 | 98.9 |
| 1 | 0.012 | 1.2 | 98.8 |

Comparison of Tables 9 and 10 and 7 and 8 shows that exactly the same improvement in performance is obtained with the design of FIG. 6 as with the design of FIG. 5.

EXAMPLE 6

Calculations were carried out to determine the performance of a pervaporation system as shown in FIG. 5, modified to contain membranes of unlike selectivities in the main unit and the auxiliary modules and further modified so that residue stream 111 from the auxiliary modules is not returned to the main pervaporation unit, in separating a raw solution containing 5 wt% water in butanol. The main pervaporation unit, 102, was assumed to contain a water-selective membrane with a water/butanol separation factor of approximately 20. The water-enriched permeate, 104, from the pervaporation unit is passed to the condenser, 105, and thence to the decanter, 107. The aqueous phase, 109, from the decanter is passed to the auxiliary module, 110, which contains a butanol-selective membrane with a butanol/water separation factor of approximately 50. The residue, 111, from this membrane can be discharged. The permeate, 112, is returned upstream of the condenser. The butanol phase, 108, from the decanter can be mixed with the incoming raw solution, 101, or could be passed to a second auxiliary module containing a water-selective membrane. The compositions of the various streams are listed in Table 11.

TABLE 11

| Stream (see Fig. 5) | Composition (wt % butanol/wt % water) |
| --- | --- |
| 101 | 95/5 |
| 103 | 99.5/0.5 |
| 104 | 60/40 |
| 108 | 85/15 |
| 109 | 8/92 |
| 111 | 1/99 |
| 112 | 40/60 |

It may be seen that both streams from the decanter, 108 and 109, "non-product" streams in this case; the stream from the auxiliary module, 111, is the purified water product stream. This stream is discharged, not returned to the main pervaporation unit.

We claim:

1. A method for increasing efficiency in a pervaporation system for removing a component from a liquid stream, said system including in series a pervaporation unit, a driving means for transmembrane permeation and a recovery unit, comprising:
   (a) connecting a permselective membrane to said system in such a way that a driving force for transmembrane permeation is provided by said driving means;
   (b) passing a stream from said recovery unit across said permselective membrane, thereby producing a depleted stream depleted in said component compared with said stream and an enriched stream enriched in said component compared with said stream; and
   (c) passing said enriched stream to an inlet side of said driving means.

2. The method of claim one, wherein said driving means for transmembrane permeation comprises a condenser.

3. The method of claim one, wherein said driving means for transmembrane permeation comprises a pump.

4. The method of claim one, wherein said driving means for transmembrane permeation comprises an eductor.

5. The method of claim one, wherein said liquid stream is heated before entering said pervaporation system.

6. The method of claim one, wherein said depleted stream has about the same concentration of said component as said liquid stream.

7. The method of claim one, further comprising:
   (d) recirculating said depleted stream to join said liquid stream.

8. The method of claim one, wherein said stream is heated before being passed across said permselective membrane.

9. The method of claim 8, wherein said stream is heated by bringing it into heat-exchanging relationship with a residue stream from said pervaporation unit.

10. A pervaporation process, comprising:
    (a) passing a liquid stream containing a component through a pervaporation unit;

(b) withdrawing from said pervaporation unit a component-enriched stream;

(c) passing said component-enriched stream to a condenser to produce a condensed stream;

(d) passing said condensed stream to a recovery unit;

(e) withdrawing from said recovery unit a stream;

(f) passing said stream across a permselective membrane wherein a driving force for transmembrane permeation is provided at least partially by said condenser;

(g) withdrawing from said permselective membrane a depleted stream depleted in said component compared with said stream;

(h) withdrawing from said permselective membrane an enriched stream enriched in said component compared with said stream;

(i) passing said enriched stream to an inlet side of said condenser.

11. The process of claim 10, wherein said recovery unit comprises a decanter.

12. The process of claim 10, wherein said recovery unit comprises a distillation unit.

13. The process of claim 10, wherein said recovery unit comprises an adsorption unit.

14. The process of claim 10, wherein said recovery unit comprises a solvent extraction unit.

15. The process of claim 10, wherein said liquid stream is heated before entering said pervaporation unit.

16. The process of claim 10, wherein said depleted stream has about the same concentration of said component as said liquid stream.

17. The process of claim 10, further comprising:

(j) recirculating said depleted stream to join said liquid stream.

18. The process of claim 10, wherein said stream is heated before being passed across said permselective membrane.

19. The process of claim 18, wherein said stream is heated by bringing it into heat-exchanging relationship with a residue stream from said pervaporation unit.

20. A pervaporation process, comprising:

(a) passing a liquid stream containing a component through a pervaporation unit;

(b) withdrawing from said pervaporation unit a component-enriched stream;

(c) passing said component-enriched stream to a condenser to produce a condensed stream;

(d) passing said condensed stream to a recovery unit;

(e) withdrawing from said recovery unit a stream;

(f) passing said stream across a permselective membrane;

(g) withdrawing from said permselective membrane a depleted stream depleted in said component compared with said stream; (h) withdrawing from said permselective membrane an enriched stream enriched in said component compared with said stream;

(i) passing said enriched stream to an inlet side of said recovery unit.

21. The process of claim 20, wherein said recovery unit comprises a decanter.

22. The process of claim 20, wherein said recovery unit comprises a distillation unit.

23. The process of claim 20, wherein said recovery unit comprises an adsorption unit.

24. The process of claim 20, wherein said recovery unit comprises a solvent extraction unit.

25. The process of claim 20, wherein said liquid stream is heated before entering said pervaporation unit.

26. The process of claim 20, wherein said depleted stream has about the same concentration of said component as said liquid stream.

27. The process of claim 20, further comprising:

(j) recirculating said depleted stream to join said liquid stream.

28. The process of claim 20, wherein said stream is heated before being passed across said permselective membrane.

29. The process of claim 28, wherein said stream is heated by bringing it into heat-exchanging relationship with a residue stream from said pervaporation unit.

30. Apparatus for separating a component from a liquid stream, comprising:

(a) a pervaporation unit;

(b) a driving means for transmembrane permeation connected to an outlet from said pervaporation unit;

(c) a recovery unit connected downstream of said driving means;

(d) a permselective membrane connected to said recovery unit and said driving means, in such a way that a driving force for transmembrane permeation is provided by said driving means.

31. The apparatus of claim 30, wherein said driving means for transmembrane permeation comprises a condenser.

32. The apparatus of claim 30, wherein said driving means for transmembrane permeation comprises a pump.

33. The apparatus of claim 30, wherein said driving means for transmembrane permeation comprises an eductor.

34. The apparatus of claim 30, wherein said recovery unit comprises a decanter.

35. The apparatus of claim 30, wherein said recovery unit comprises a distillation unit.

36. The apparatus of claim 30, wherein said recovery unit comprises an adsorption unit.

37. The apparatus of claim 30, wherein said recovery unit comprises a solvent extraction unit.

38. Apparatus for separating a component from a liquid stream, comprising:

(a) a pervaporation unit;

(b) a driving means for transmembrane permeation connected to an outlet from said pervaporation unit;

(c) a recovery unit connected downstream of said driving means;

(d) a permselective membrane connected to said recovery unit in such a way that a stream from said recovery unit can pass to a feed side of said permselective membrane and a treated stream from said permselective membrane can return to said recovery unit, (e) second driving means for providing a transmembrane driving force across said permselective membrane.

39. The apparatus of claim 38, wherein said driving means for transmembrane permeation comprises a condenser.

40. The apparatus of claim 38, wherein said driving means for transmembrane permeation comprises a pump.

41. The apparatus of claim 38, wherein said driving means for tranmembrane permeation comprises an eductor.

42. The apparatus of claim 38, wherein said recovery unit comprises a decanter.

43. The apparatus of claim 38, wherein said recovery unit comprises a distillation unit.

44. The apparatus of claim 38, wherein said recovery unit comprises an adsorption unit.

45. The apparatus of claim 38, wherein said recovery unit comprises a solvent extraction unit.

46. The apparatus of claim 38, wherein said second driving means comprises a condenser.

47. The apparatus of claim 38, wherein said second driving means comprises a pump.

48. The apparatus of claim 38, wherein said second driving means comprises an eductor.

* * * * *